United States Patent [19]

Derain et al.

[11] Patent Number: 4,576,540
[45] Date of Patent: Mar. 18, 1986

[54] DEVICE FOR COMPACTING CONTENTS OF HIGH CAPACITY SEMITRAILER BODY

[75] Inventors: Christian Derain, Conches; Henri R. Saint-Marc, Evreux, both of France

[73] Assignee: Societe Nouvelle des Bennes Saphem, La Barre-en-Ouche, France

[21] Appl. No.: 589,837

[22] Filed: Mar. 15, 1984

[30] Foreign Application Priority Data

Mar. 16, 1983 [FR] France ................................. 83 04313

[51] Int. Cl.⁴ ................................................. B60P 1/00
[52] U.S. Cl. .................................... 414/511; 414/512; 414/517; 100/295
[58] Field of Search ............... 414/509, 511, 512, 517; 100/295

[56] References Cited

U.S. PATENT DOCUMENTS

| 2,712,388 | 7/1955 | Skromme et al. | 414/511 |
| 3,349,931 | 10/1967 | Wagner | 414/517 X |
| 3,734,005 | 5/1973 | Vogel | 100/295 X |
| 3,802,585 | 4/1974 | Churchman | 414/517 |
| 3,865,260 | 2/1975 | Wieschel et al. | 414/517 |
| 4,057,157 | 11/1977 | Park et al. | 100/295 X |
| 4,234,130 | 11/1980 | Trott et al. | 414/511 X |

FOREIGN PATENT DOCUMENTS 2423369 11/1979 France .

Primary Examiner—Robert J. Spar
Assistant Examiner—Ken Muncy
Attorney, Agent, or Firm—Sheridan Neimark; A. Fred Starobin

[57] ABSTRACT

A compacting device located forwardly of a body, especially a close body of a high capacity semitrailer which received by gravity, through an opening formed in a forward upper part of the body, mainly household or industrial waste products as well as any other products of low density. The device compresses two parts moveable one with respect to each other which includes a compacting shield capable of moving above the bottom of the body and an apron capable of moving above the shield, with controls to control the motions of the shield and the apron, and two other moveable supporting parts including supporting a carriage and a slider supporting the controls, in the first phase move, and the motion of the shield and the apron, in a second time phase move, for total ejection of the waste products after transportation to a dump site.

11 Claims, 3 Drawing Figures

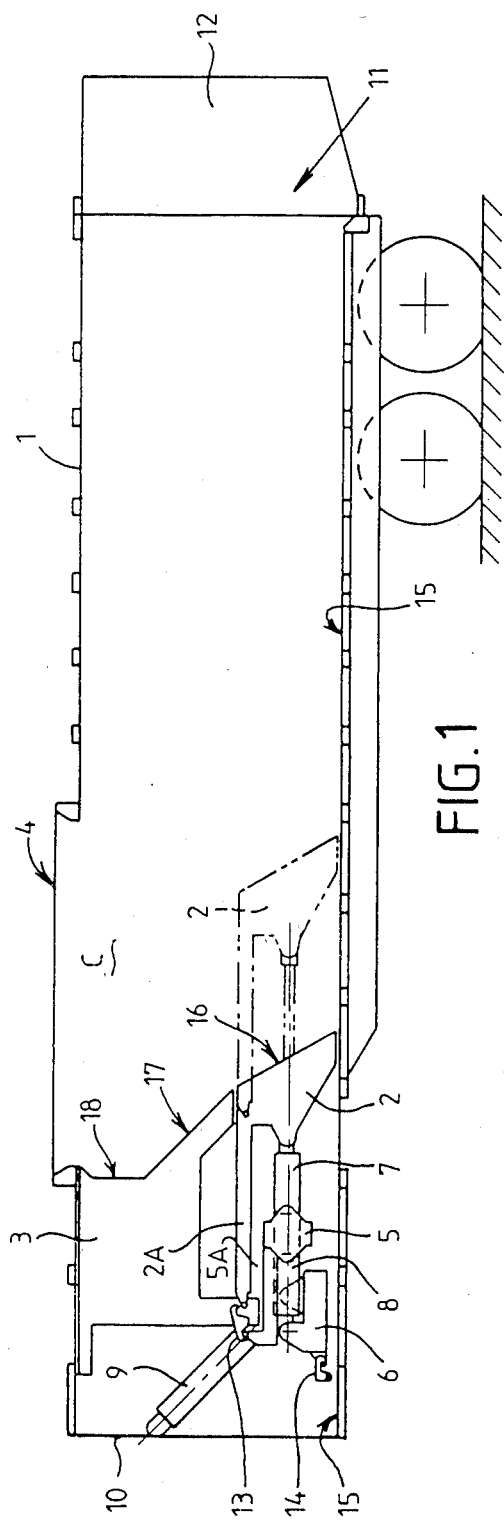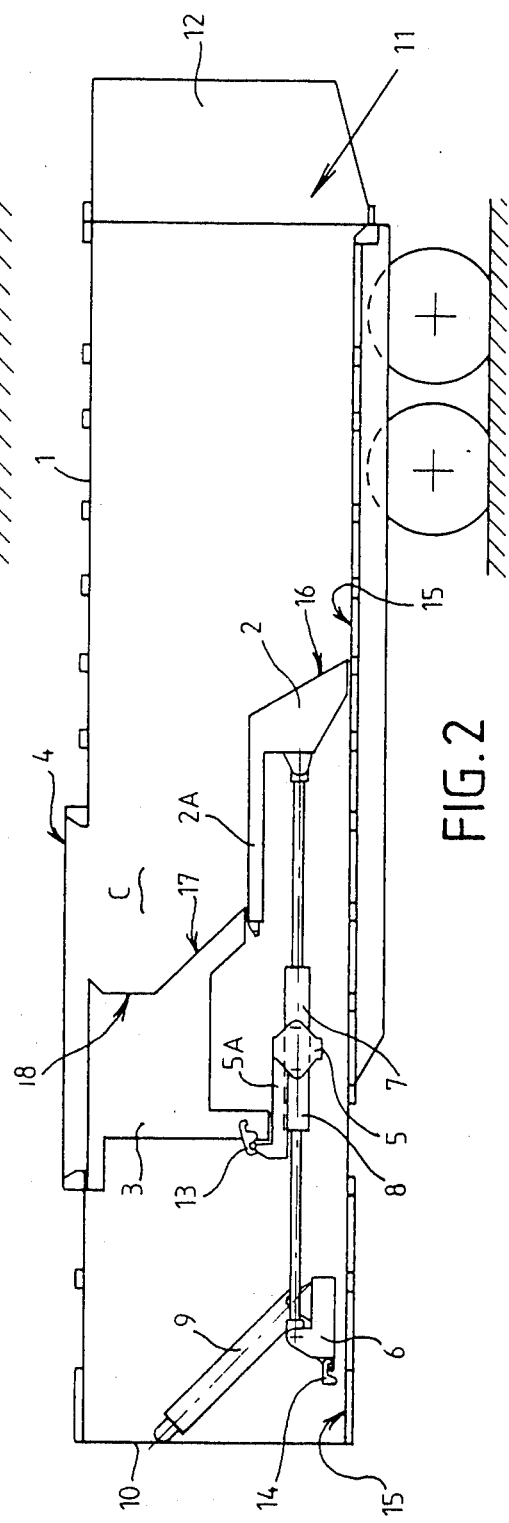

DEVICE FOR COMPACTING CONTENTS OF HIGH CAPACITY SEMITRAILER BODY

FIELD OF THE INVENTION

This invention relates to a compacting device located forwardly of a body more especially a closed body of a high capacity semitrailer for receiving by gravity through an opening formed in the upper forward portion of such body mainly household or industrial waste products as well as any other products of low density.

This invention provides a device permitting compaction of the waste products in the body while allowing for simultaneous and continuous loading into such body, the waste products being ejected from the body after transportation.

BACKGROUND OF THE INVENTION

There is known from U.S. Pat. No. 3,865,260 Wieschel et al, a compacting device comprising a movable part capable of moving independently above the bottom of the body, on the one hand, and on the other hand, of moving with a second mobile part superposed thereupon, a telescopic jack of great length when extended being required to move the assembly of both parts from the front to the rear of the body.

There is known through U.S. Pat. No. 3,802,585 of Churchman, a compacting device also comprising two superposed parts each having however a different control jack and in this case the top part comprises a jack of a great length.

SUMMARY OF THE INVENTION

The object of this invention is to provide a device for permitting the telescopic jack for controlling the assembly of both parts to have a smaller length in the extended position.

The object of this invention is a compacting device comprising two parts movable one relative to the other, i.e. a compacting shield movable above the bottom of the body and an apron movable above the shield, characterized by also comprising two other movable supporting parts for controls of the motions of the shield and of the apron in a first time, and motion of the assembly in a second time so that the waste products are totally ejected after transportation.

A carriage and a slider form the supporting parts for the controls of compacting, of capacity reserve for simultaneous continuous loading, and of waste product ejection after transportion.

The shield, apron, carriage and slider are slidable parts moving on slideways of the body.

A lock is provided for connecting the apron to the supporting carriage in a first time and another lock is provided for connecting the slider to the body during the first time, the first mentioned lock also connecting the shield and the apron for waste product ejection from the body after transportation, the slider being then released from the second lock.

The locks are tipping locks controlled by electrical valves.

The controls are formed by jacks. One jack rests both on the supporting carriage and the shield, another jack rests on said supporting carriage and on said slider, and a further jack rests on the slider and the body.

BRIEF DESCRIPTION OF THE DRAWINGS

Further characteristics and advantages of this invention will appear from the following description which is made in reference to the attached drawings in which:

FIG. 1 is a lateral elevational and longitudinal cross-sectional view of a high capacity semitrailer body provided with a compacting device of the present invention in the initial position for compacting and starting the compacting phase, with the extension of one jack;

FIG. 2 is a similar view including the compacting and also semicompacting phase while continuing continuous loading, with the extension of two jacks.

DESCRIPTION OF PREFERRED EMBODIMENTS

Figure 3:
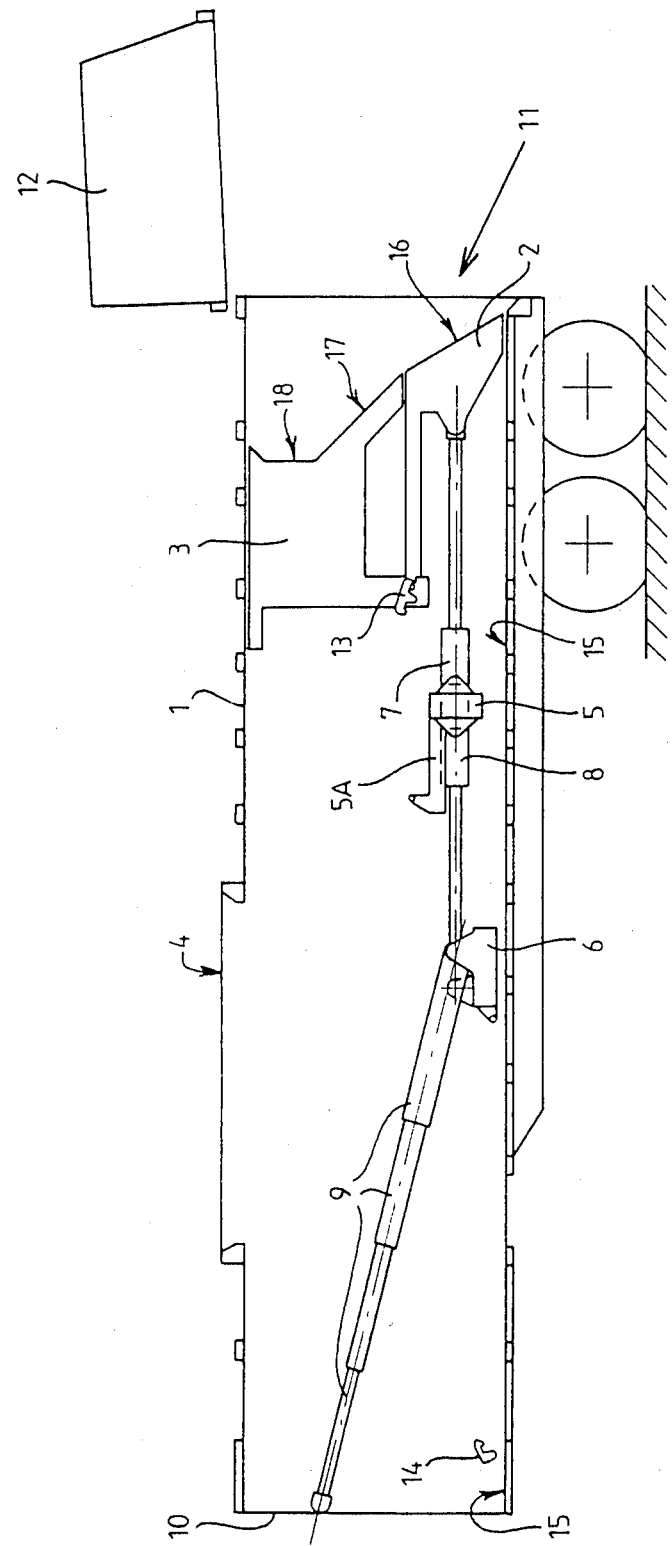
FIG. 3 is also a similar view showing the ejection phase for ejection of the compacted trash after total compacting and transportation to the dumping site, with the extension of all jacks.

In the form of embodiment shown the device for compacting, simultaneous loading and then for ejection after transportation, comprises four parts movable with respect to one another along slideways, not shown, provided on the body 1. They are constituted by a compacting shield 2, a semicompacting apron 3, with provision of a capacity C (FIG. 2) for continuously receiving a waste product load through the upper opening 4 of the body, a supporting carriage 5 and a supporting slider 6.

A jack 7 is disposed between the shield 2 and the supporting carriage 5. Another jack 8 is disposed between the supporting carriage 5 and the slider 6. Another jack 9 which is telescopic is disposed between the slider 6 and an end 10 of the body 1.

It must be noted that such jack 9 is of a lesser length in the extended position as compared to jacks of the same type for the existing semitrailer bodies due in particular to the spacings which separate during ejection the shield 2 from the carriage 5, and the carriage 5 from the slider 6.

At its end 11 turned away from the end 10 the body comprises a tipping door 12.

A tipping lock 13 is mounted to the apron 3 so as to be able to lock either an extension 5A of the carriage 5 or an extension 2A of the shield 2.

Another tripping lock 14 is mounted to the bottom 15 of the body 1 to lock the slider 6.

The shield 2 is conformed so as to present a slope 16 inclined from the bottom 15 to the forward end 10 of the body.

The apron 3 presents a slope 17 inclined in the same direction as the slope 16, and capable of being brought into an angular extension of the slope 16 of the shield 2 (in a given relative position of the shield and the apron).

The slope 17 of the apron 3 is extended angularly (away from the slope 16 when the latter is in said relative given position mentioned above) through a vertical or substantially vertical portion 18 directed upwardly.

The tipping locks 13 and 14 are controlled by electrical valves (not shown).

In operation and in a first time, the unlocked shield 2 due to the action of jack 7 taking rest upon the carriage 5 then stationary, produces initial compacting (FIG. 1). Such compacting is continued when jack 8, being actuated, causes displacement of the assembly of the carriage 5, the shield 2 and the apron 3. The apron 3 during the motion thereof constantly provides for a sufficient capacity C to permit continuous loading of waste products through the opening 4 of the body 1 up to the limiting position shown in FIG. 2. Therefore, such capacity C has a reduced opening as the compacting obtained by the shield 2 and the semicompacting obtained by the apron 3 are continued, the operation of the jack 8 being produced at any time t during the time period of motion of the shield 2 through the jack 7.

Once the body 1 of the semitrailer has been loaded, the waste products are transported to the treating sites. The compacted waste products are then ejected through the rear end 11 of the body 1, with the door 12 being moved up (FIG. 3). To this end the assembly of the slider 6, the carriage 5, the shield 2 and the apron 3 is moved until the slope 16 of the shield 2 reaches the opening 11. This motion of the assembly is obtained by unlocking the slider 6 and through the telescopic jack 9.

Therefore, the shifting motions are decomposed into three times, i.e. compacting time, compacting and semicompacting time, with continuous loading occurring during these two compacting and semicompacting times; and a third time or ejection time occurs after total compacting and transportation to the sites.

It is also to be noted that the compacting shield 2 considered alone produces a higher compacting pressure in as much as its height is low as compared to the height of the semitrailer body and to the single shield of the existing systems extending over the full height of the body.

We claim:

1. A compacting device located forwardly of a body, especially a closed body of a high capacity semitrailer for receiving by gravity mainly household or industrial waste products as well as any other products of low density, through an opening formed in a forward upper part of such body, comprising two parts moveable one with respect to the other including a compacting shield capable of moving above the bottom of the body and an apron capable of moving above said shield, controls of motions of said shield and said apron, in a first phase move, and of motion of said shield and said apron, in a second phase move, for total ejection of the waste products after transportation, and two other moveable supporting parts including a supporting carriage and a slider supporting said controls, said controls including jacks, one jack supported both on said supporting carriage and said shield, another jack supported on said supporting carriage and said slider, and a further jack supported on said slider and said body.

2. A device according to claim 1 in which a first lock is provided for connecting said apron with said supporting carriage in said first phase move, and a second lock is provided for connection of said slider with said body in this same first phase move, said first lock connecting moreover said shield and said apron for ejection of waste products from said body after transportation, said slider being then released from said second lock.

3. A device according to claim 1 in which said shield is conformed so as to present an inclined first slope from the bottom to the front end of said body, and said apron presents a second slope inclined in the same direction as said first slope and capable of being brought into an angular extension of said first slope of said shield, in a given relative position of said shield and said apron.

4. A device according to claim 3, characterized in that a vertical portion away from said second slope when the latter is in said relative given position extends angularly with respect to said slope of said apron.

5. A compacting device located forwardly of a body, especially a closed body of a high capacity semitrailer for receiving by gravity mainly household or industrial waste products as well as any other products of low density, through an opening formed in a forward upper part of such body, comprising two parts moveable one with respect to the other including a compacting shield capable of moving above the bottom of the body and an apron capable of moving above said shield, controls of motion of said shield and said apron for total ejection of the waste products after transportation, and two other moveable supporting parts including a supporting carriage and a slider supporting said controls, said controls including;

a first control means for moving said compacting shield with respect to said carriage and connecting said shield and said carriage, a second control means for moving said carriage with respect to said slider and connecting said carriage and said slider, a third control means for moving said slider with respect to the body and connecting said slider and the body.

6. The device of claim 5 wherein said control means include at least one jack.

7. The device of claim 5 further comprising first lock means for selectively connecting said apron with either said compacting shield or said carriage.

8. The device of claim 7 further comprising second lock means for selectively connecting said slider with the body when said third control means is to be non-actuated.

9. The device of claim 7 wherein said first locking means is a tipping lock.

10. The device of claim 8, wherein said second locking means is a tipping lock.

11. The device of claim 7, wherein said first, second and third control means are jacks.

* * * * *